Figure 1:
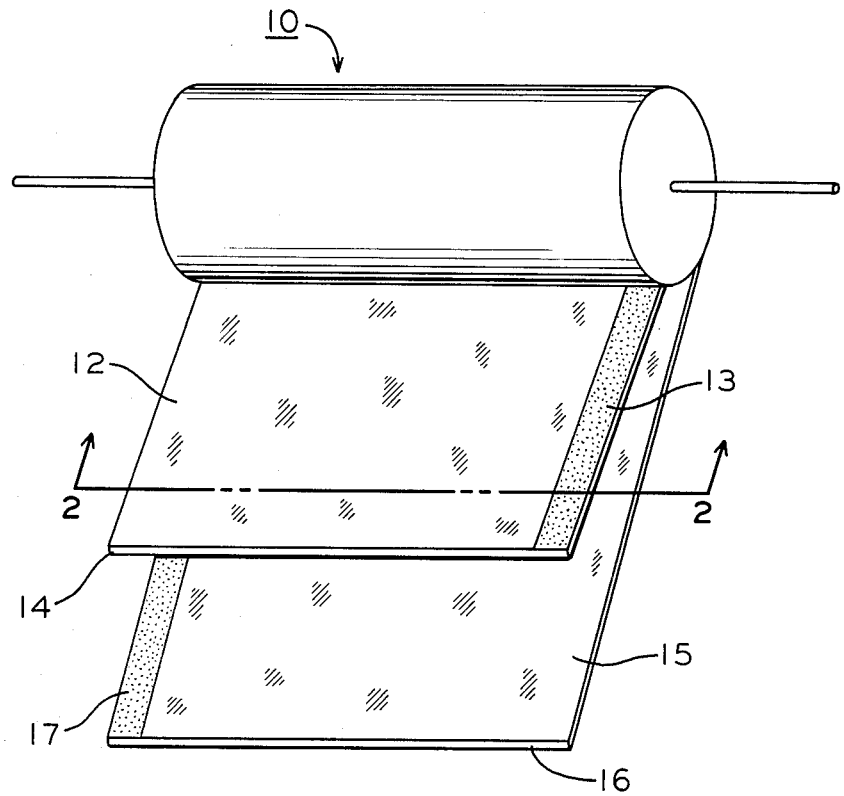

Aug. 24, 1965

P. H. NETHERWOOD 3,202,892

SELF-HEALING CAPACITOR

Filed Feb. 20, 1959

*INVENTOR.*
PAUL H. NETHERWOOD
BY *Connolly and Hutz*

HIS ATTORNEYS 3,202,892
SELF-HEALING CAPACITOR
Paul H. Netherwood, Williamstown, Mass., assignor to Sprague Electric Company, North Adams, Mass., a corporation of Massachusetts
Filed Feb. 20, 1959, Ser. No. 794,672
5 Claims. (Cl. 317—258)

This application is a continuation-in-part of my copending application Ser. No. 584,760, filed May 14, 1956 (now U.S. Patent 2,938,153, issued May 24, 1960), for "Electrical Capacitors," in which there is disclosed a convolutely wound self-healing capacitor having two vapor-deposited metal strata each on a resin film supported on a porous matrix.

This invention relates to improved electrical capacitors and more particularly refers to metallized electrode capacitors.

Metallized paper capacitors have been known for many years and have come into greater use because of the increased emphasis on reliability, small size and other factors important in both commercial and military equipments. The usual metallized paper capacitor employs a paper base upon which a thin layer of resin is deposited from a solvent with the resin surface being used as a base for an evaporated zinc or aluminum deposit. This resin lacquer has been limited to relatively low melting materials in order to provide for better adherence of the resin for the deposited metal. Capacitors rolled with two such electrodes are normally impregnated with a wax or an oil. Numerous impregnants cannot be used with these capacitors because of the unpredictable resulting series resistance. As is well known the particular advantage of these capacitors resides in the fact that they are more or less self-healing; that is, a flaw in the dielectric spacing will result in "burning" away of the electrode metal from the immediate area of the fault.

This self-healing action, while theoretically perfect, does not in practice result in complete stability or maintenance of initial electrical characteristics. Minor capacitance loss may result and this is not usually of importance. However, it is found that a serious and usually permanent decrease of insulation resistance of the capacitor may be expected when the number of such self-healing actions is at all large. This lowering of insulation resistance leads to serious consequences at elevated temperatures since the resistance value of the path contributing to the lowered insulation resistance becomes sufficiently low to cause self-healing of the capacitor which in turn lowers the resistance even further, and often leads to complete failure of the capacitor. Whether or not this effect is due to localized melting of the dielectric material and resin is not known, but it appears to be a contributing factor.

The rolled convolutions of the electrodes metallized on an impregnated paper base are tight windings preferably as compact as capacitor winding techniques will provide. The metal electrode applied to the paper base is subjected to physical flexure. At the same time the metal strata making up this electrode must be continuous without a break. The paper base on which the metallized electrode is attached must be receptive to impregnation with a dielectric. This impregnation takes place after the tight winding of the layers into the compact rolls of convolutely wound capacitor. The porous paper which is receptive to impregnation with a dielectric does not provide a smooth base for reception of the metallized electrode stratum. Further, the thin layer of resin deposited on the paper to provide a smooth base for the metallized layer must be amenable to the type winding as well as temperature resistant and inert to the dielectric impregnants.

It is an object of this invention to provide a rolled capacitor of metallized electrodes having good insulation resistant properties under operation at elevated temperatures.

Another object of this invention is the provision of a metallized electrode capacitor which operates at elevated temperatures.

It is still another object of this invention to provide a rolled capacitor having a metallized electrode deposited on an impregnatable base that is adapted to satisfactorily receive standard dielectric impregnants.

Figure 2:
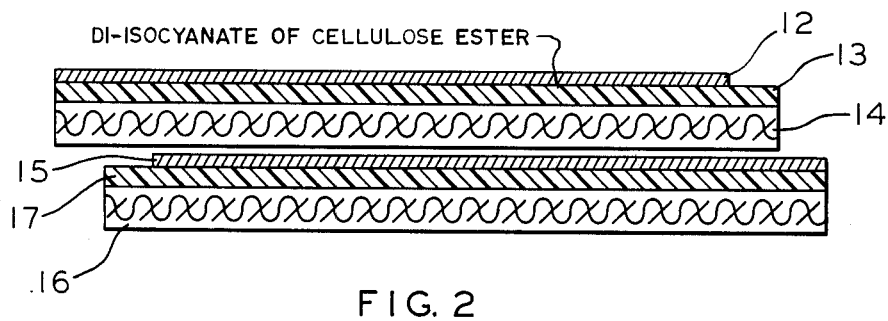

These and other objects of this invention will become more apparent upon consideration of the following description taken together with the accompanying drawings in which:

FIGURE 1 is a perspective view of a partially unrolled capacitance section showing the porous supporting base, the resinous film on the base, and the metallized strata supported on the film; and FIGURE 2 is a greatly enlarged sectional view taken along line 2—2 of FIGURE 1 and showing the layers of the composite of this invention.

In a more restricted sense the invention is concerned with the aforesaid electrical capacitor in U.S. Patent No. 2,938,153, in which the resin film is of a non-self-supporting nature disposed upon a fibrous matrix, and in which the fibrous matrix is subsequently impregnated with a dielectric from the group which includes both liquid dielectrics and in situ polymerized infusible thermoset resins.

I have discovered that the metallized electrode type capacitor can be made suitable for continuous operation at highly elevated temperatures and under substantial voltage gradients if the dielectric system is in its entirety of a solid state and infusible in nature. In its broadest concept, the dielectric may in part include a liquid substance such that each constituent of the dielectric, where more than one be used, is by itself, or in combination with another constituent, incapable of melting or of exercising any solvent action on any capacitor constituent and realize an extension of the operational life of an unpredictable magnitude.

This invention is particularly directed to the metallized paper capacitor having a paper spacer on which the resin film is selected from the group of cellulose ethers and esters containing a hydroxy radical which are cross-linked by various diisocyanates. The paper spacer is treated with the resin film of cellulose acetate which is cross-linked with the diisocyanate by curing for a period which produces a smooth resin coat on the porous matrix base. On this resin film the metal electrode is metallized. The deposited film adheres readily to the resin film. The metallized resin coated dielectric layer supporting the metallized electrode is wound into tight convolutions to form a rolled capacitor and the assembly is impregnated.

The resin film used as a base for the metal electrode is an infusible material which is thermosetting in nature and thus can be used advantageous with an in situ polymerized infusible thermoset resin as the dielectric impregnant.

In FIGURE 1 the partially unrolled perspective showing of capacitance section 10 comprising successive convolute windings of a metallized electrode 12 on a non-self-supporting resin film 13 applied to a porous impregnated dielectric cellulose spacer 14. A second metallized electrode 15 is similarly supported as shown in the next convolution. In this convolutely wound assembly there are two porous spacers 14 and 16. Each spacer carries its respective resin film 13 and 17 and metallized electrode 12 and 15. The section 10 is partly unrolled to show the successive arrangement of the layers of the convolutions.

FIGURE 2 shows a greatly expanded sectional view illustrating the arrangement of the layers making up the spacer-electrode combinations. The electrode 12 is shown forming the upper surface of the combination and overlying the resin film 13 which is coated on the spacer 14. The second electrode 15 is shown overlying the resin film 17 on the spacer 16. The electrodes 12 and 15 are margined on opposite sides. The electrode 12 is margined on the left side so that an area A of the resin film 13 is not overlain by the electrode 12. Conversely, the electrode 15 is margined at the right side as seen in FIGURE 2 and in a space B the resin film 17 is not overlain by the electrode 15.

The FIGURE 1 perspective view shows the two spacer electrode combinations which are interwound to make the convolutely wound assembly of capacitance section 10. The spacer 14 has coextensive with its upper surface the resin film 13. This resin film 13 provides the spacer 14 with a smooth continuous upper surface. The electrode 12 is metallized onto this smooth upper surface of the resin film 13. This metallized electrode is deposited in a very thin layer by a method such as vapor deposition in a vacuum metallized apparatus. The electrode is not self-supporting but is electrically continuous to provide a continuous electrode which can be convolutely wound into the rolled capacitor as illustrated in FIGURE 1. The similar spacer electrode combination of electrode 15 on spacer 16 is also shown in FIGURE 2.

The resin materials making up the films 13 and 17 are suitable for use as base layers for the metallized electrodes 12 and 15. The resin films 13 and 17 are deposited on the fibrous spacers 14 and 16. The resin film is made up of hydroxy containing cellulose ethers and esters cross-linked with various suitable diisocyanates. Such films are generally non-self-supporting and have a thickness of .01" to less than 0.25 mil.

The fibrous or porous matrix upon which the resin film is deposited may consist of paper products made from cellulose or regenerated cellulose fibers, hemp, ramie or linen fibers, or other similar materials. Other materials include inorganic fibers, platelets, etc., as for example, asbestos, glass, itacolumite, mica paper and the like which are for the purposes of my invention infusible over the range of temperatures to be encountered. Also one can advantageously use ths invention with resinous porous spacers such as porous polytetrafluoroethylene resin.

The porous matrix should be impregnated and preferably with a material possessing the desired and necessary infusibility. Numerous organic systems can be used for this latter purpose. Illustrative of these are the unsaturated polyester-vinyl monomer systems, in which an unsaturated bifunctional ester, such as diallylphthalate, propylene glycol maleate, etc., is copolymerized with styrene, N-vinyl pyrroles, vinyl naphthalene and other vinyl monomers to produce a thermoset resin. Another class of suitable resins comprise those produced by copolymerizing such vinyl monomers as these described immediately above with divinyl benzene, trivinyl benzene and other polyfunctional vinyl monomers, as well as substituted derivatives thereof. Such in situ polymerizable impregnants are mixtures of polybutadiene-1,3 (average molecular weight 1500), vinyl toluene, divinyl benzene and polyalphamethylstyrene-styrene - divinylbenzene. Other suitable impregnants for use in the liquid state include polyisobutylene and mineral oil.

This impregnation is normally conducted following winding, stacking or other assembly of the capacitor. The polymerization may be catalyzed by peroxides, ultraviolet, neutron bombardment and/or heat, and may be accelerated by use of metal naphthenates, etc.

The thickness of the individual metallized electrodes is very small and ranges from about $10^{-4}$ to $10^{-6}$ inches. The electrode may be deposited by a number of means including chemical decomposition, gas decomposition, sputtering, etc., but preferably by vapor deposition in an atmosphere of much reduced pressure, for example, 10 microns. The metals employed include zinc, aluminum, silver, tin, lead, etc. For high temperature units, that is for operation at 105° C. and higher, aluminum or nickel should be used.

An electrostatic capacitor is made up according to this invention from materials selected from the described types to give a substantially uniform voltage gradient throughout and across the dielectric spacing material. The following examples are illustrative of this invention and are not intended to be limitative.

*Example I*

A paper spacer with a density of 1.08 and porous to be suitably impregnatable was coated on one surface with a layer of diisocyanate cross-linked cellulose acetate. The coating mixture consisted of 12 pounds of cellulose acetate having between 56 and 56.5% of combined acetic acid, 20 pounds of toluene dissolved in 90 pounds of acetone and 20 pounds of methylisobutyl ketone containing 3.4 pounds of dianisidiene di-isocyanate (DADI) and 15 grams of oil of red. The resin mixture has a viscosity of 300 centipoises at 24° C. and was applied to the surface of the paper spacer and cured for 16 hours at 130° C. The resulting dielectric was metallized upon the cellulose acetate diisocyanate surface with a thin conductive coating of aluminum of about $10^{-4}$ inch thickness by cathode sputtering. The spacer electrode combination was convolutely wound into a capacitance section and impregnated with a suitable dielectric impregnant.

*Example II*

A dielectric spacer consisting of a paper spacer with a density of 1.08 was coated on one surface with a cellulose acetate diisocyanate coating mixture. The coating mixture consisted of 12 pounds of cellulose acetate having 56 to 56.5% of combined acetic acid dissolved in 110 pounds of acetone and containing 3 pounds pp' diphenyl methane diisocyanate (MondruM by Mobay) and 15 grams of oil of red. The coating mixture had a viscosity of 170 centipoises at 120° C. and was applied to the surface of the paper spacer and cured to insolubility at 130° C. for 16 hours. The resulting dielectric was metallized upon the cellulose acetate diisocyanate surface with a thin conductive coating of aluminum of about $10^{-4}$ inch thickness by cathode sputtering. The spacer electrode combination was convolutely wound into a capacitance section and impregnated with a suitable dielectric impregnant.

In the coating mixtures of these examples the cellulose acetate has enough acetylation so as not to soften at the curing temperature. This has been found to be important. The diisocyanates have good solubility in the ketone solvents to insure effective use. It has been found that the aromatic diisocyanates such as those set forth in the examples and containing more than one benzene ring have superior properties of flexibility and pot life. The dianisidiene di-isocyanate (DADI) and pp' diphenyl methane di-isocyanate (MondurM by Mobay) having pot life of 4 days which together with the flexibility provided to the resin film particularly adapt these diisocyanates to this invention.

As a final step in the processing of the units of this invention after impregnation they may be suitably encapsulated in molded casings and otherwise encased in containers. After encasement in containers the section can be impregnated with a dielectric oil or wax to eliminate any voids which may occur in the assembly. Also the section may be oil impregnated prior to the cross-linking of the coating substance and it is also possible to bring about.

One major advantage of the new metallized dielectric electrode film of this disclosure is that there is substantially no tendency for the resin substrata holding the metallic layer to be dissolved during impregnation. This particular item represented a serious problem with many prior art units in which a common lacquer was used as the immediate support for the metal layer.

The finished capacitor includes a solid state device in which thermal effects are substantially eliminated. I do not claim that my metal electrodes are not burned away or sparked away, but I have observed that the insulation resistance of the capacitor, particularly at elevated temperatures, and for extended periods of time, remains at a very high and safe level. Degradation products, if they are formed, do not migrate under any operating conditions. Thus in the case of a paper capacitor, I may operate at temperatures of 150° C. or higher, well above the operational temperature of any metallized paper capacitor of the prior art. I am also able to operate at voltage gradients in the neighborhood of 1500 to 2000 volts per mil even at elevated temperatures. Unequal stresses are avoided and overall performance, through increased maximum voltages, may be achieved.

As many apparently widely different embodiments of this invention may be made without departing from the spirit and scope thereof, it is to be understood that the invention is not limited to the specific embodiments hereof except as defined in the appended claims.

What is claimed is:

1. A convolutely wound self-healing capacitor having a non-self-supporting vapor-deposited stratum of metal on a smooth resin film deposited on a porous matrix, said resin film comprising a cellulose ester containing a hydroxy radical cross-linked with a di-isocyanate, and a dielectric material impregnating said porous matrix, said resin being inert to said dielectric material.

2. The combination of claim 1 wherein the di-isocyanate is dianisidiene di-isocyanate.

3. The combination of claim 1 wherein the di-isocyanate is pp' diphenyl methane di-isocyanate.

4. A capacitor as defined in claim 1 wherein said di-isocyanate is an aromatic di-isocyanate having more than one benzene ring.

5. A capacitor as defined in claim 4 wherein said cellulose ester is cellulose acetate.

References Cited by the Examiner

UNITED STATES PATENTS

| | | |
|---|---|---|
| 2,415,839 | 2/47 | Neal. |
| 2,430,479 | 11/47 | Pratt. |
| 2,468,713 | 4/49 | Kropa. |
| 2,741,730 | 4/56 | Maylandt et al. _____ 317—258 |
| 2,749,490 | 6/56 | Peck _____ 317—258 |
| 2,806,190 | 9/57 | Robinson _____ 317—258 |
| 2,935,668 | 5/60 | Robinson et al. _____ 317—258 |

FOREIGN PATENTS 138,665  9/50  Australia.

OTHER REFERENCES

Ser. No. 313,985, Strab (A.P.C.), published May 11, 1943.

JOHN F. BURNS, *Primary Examiner.*

SAMUEL BERNSTEIN, *Examiner.*